3,039,904
REFLECTIVE FABRIC AND ITS MANUFACTURE
Leo J. Stage, Roselle Park, N.J., assignor to Sun Chemical
 Corporation, Long Island City, N.Y., a corporation of
 Delaware
No Drawing. Filed Jan. 6, 1959, Ser. No. 785,125
1 Claim. (Cl. 154—44)

The present invention relates to reflective heat resistant fabric suitable for use as draperies, firefighters' protective clothing and the like.

Prior art attempts to provide satisfactory fabrics of this type may be found in United States Patents 2,703,772 and 2,702,580 dated March 8, 1955, and February 22, 1955, respectively. Both use special adhesives for bonding a metallized surface on a woven backing fabric, the former employing a delaminating technique and the latter using a laminating technique placing the metallized surface between the woven fabric and a plastic film.

It has now been found that more uniform metal films of longer useful life can be obtained while making a more flexible finished fabric by heat and pressure laminating a thin film of plastic directly on to a heat resistant woven fabric base and thereafter coating the film side of the product with a metal, preferably by a vapor coating of aluminum.

The base fabric may be of any suitable fibers, but it has been found that heat resistant fibers such as asbestos and glass are most satisfactory. The preferred fabric is made predominately of asbestos with some glass to improve its properties.

The plastic film may be made from any of several materials including especially the polyester films made from sheets of substantially linear polyester polymers conforming to the general recurrent formula:

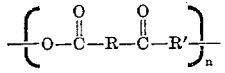

wherein R represents a bivalent radical containing the benzene nucleus and in which R' represents a bivalent aliphatic radical containing from 2 to 8 carbon atoms and in which the molecules are oriented. Such films are known under the names of Mylar, Videne and Terylene. Other satisfactory films may be made from any suitable thermoplastic material which will retain the structure of the aluminized fabric when tested for heat resistance at 1000° F. for 45 seconds. Such materials are cellulose acetate, cellulose, cellulose triacetate, polypropylene, plasticized vinyl chloride, plasticized vinylidene chloride and the like.

Heat and pressure lamination of the woven fabric and the plastic film may be carried out by any one of several techniques, depending on the thickness of the plastic film and the desired properties of the finished product. According to one method, lamination is carried out on an electrically heated platen at pressures ranging from about 5 to 1000 p.s.i., preferably about 250 p.s.i., at temperatures of from about 200° to 500° F., preferably about 350° F., for from about ½ to 30 seconds, preferably about 10 seconds. If the initial film is more than .003 inch in thickness, it will ordinarily be stretched at the time of lamination to provide a thinner and a more flexible final product.

The weight per yard of the base fabric may vary over a wide range, depending on the end use of the finished product. The thickness of the plastic film will also vary somewhat, depending on the end use of the product and the thickness of the base fabric. However, the plastic film will always be extremely thin, preferably about 0.0005 and 0.003 inch.

The reflective coating may be of aluminum, silver, gold or any other highly reflective metal, but aluminum is preferred. The metal coating may be applied by spraying a pigmented lacquer, laminating a foil or vapor coating. However, the latter is considered to be far better than the other methods because it has the advantages of providing an effective surface which is thinner, more durable and therefore is an aid in maintaining flexibility.

The invention will be more fully understood by reference to the following examples.

*Example 1*

A fabric woven from yarns of predominately asbestos with some glass fibers, having a thread count of 60×35, a weight of 11.3 ounces per square yard and a thickness of .019 inch was laminated to a 0.002 inch Videne film in an electrically heated platen at a pressure of 250 p.s.i. for 10 seconds at 350° F. A thin Teflon film was used between the Videne film and the platen to protect it from the press. The resulting product was a flexible fabric having one smooth plastic covered surface. Thereafter, the plastic surface was vapor coated with aluminum in accordance with United States Patent 2,740,732. That is, the film was first coated with a sufficient silver to provide the surface of the resin with a crystal forming nuclei in reduced pressure metallizing machine running under 1000 microns of mercury pressure. A film speed of 90 feet per minute was used. Then, an aluminum coating was evaporated from a pot of the molten metal and condensed on the cool film. Sufficient metal was used to obtain a shiny deposit. The thus coated film was then heated to 200° C. for a period of 30 minutes to relax and partially disorient the polyester surface, the heating being carried out on heated rollers.

The finished product was a flexible sheet having a smooth shiny reflective surface of aluminum coated plastic film adhering and firmly bonded to the woven backing. The product was found to have good heat resistance at 1000° F. for 45 seconds.

*Example 2*

The process of Example I was repeated using a 0.003 Mylar film in place of the Videne in the lamination step. The Mylar film was heated and stretched prior to its application to the base fabric, whereby the thickness of the applied film was actually 0.0015. The resulting product was very similar to the product produced in accordance with Example 1, except that it had more apparent flexibility.

*Example 3*

A fabric laminated with Videne as in Example 1 but not aluminized, was spray coated on the plastic side to form a film of 1 mil thickness of a silicone varnish containing 15% aluminum pigment. After which it was baked at 300–325° F. for 20 minutes. A metallized finish was obtained but it lacked the brightness of the finish produced by the process of Examples 1 and 2, and it also lacked the flexibility of hand found in the products produced in the prior examples.

I claim:

Heat reflective, heat resistant, flexible product comprising a heat-pressure laminate of a woven backing fabric formed predominantly of asbestos fibers and a film of from about 0.0005 to 0.003 inch thickness of an oriented polyester plastic and a thin, vapor-deposited, reflective metal coating coated directly on said plastic film and spaced by said plastic film from said fabric.

References Cited in the file of this patent

UNITED STATES PATENTS

| | | |
|---|---|---|
| 2,062,469 | Morgan | Dec. 1, 1936 |
| 2,065,402 | Schweller | Dec. 22, 1936 |
| 2,561,891 | Tucker | July 24, 1951 |
| 2,702,580 | Bateman | Feb. 22, 1955 |
| 2,740,732 | Peck et al. | Apr. 3, 1956 |
| 2,765,250 | Williams | Oct. 2, 1956 |
| 2,858,248 | Hastings et al. | Oct. 28, 1958 |